United States Patent [19]
> Bucalo

[11] 3,848,578
[45] Nov. 19, 1974

[54] VALVE WITH MEANS FOR PROMOTING INGROWTH OF TISSUE

[75] Inventor: Louis Bucalo, Holbrook, N.Y.

[73] Assignee: Investors in Ventures, Inc., new york, N.Y.

[22] Filed: Oct. 5, 1972

[21] Appl. No.: 295,144

Related U.S. Application Data

[63] Continuation-in-part of Ser. No. 103,606, Jan. 4, 1971, Pat. No. 3,707,957.

[52] U.S. Cl. .......................................... 128/1 R, 3/1
[51] Int. Cl. ............................................. A61b 19/00
[58] Field of Search ........ 128/1 R, 127, 274, 334 R; 3/1

[56] References Cited
UNITED STATES PATENTS

| | | | |
|---|---|---|---|
| 2,810,134 | 10/1957 | Radin | 3/13 |
| 3,546,711 | 12/1970 | Bokros | 3/1 |
| 3,687,129 | 8/1972 | Nuwayser | 128/1 R |
| 3,699,957 | 10/1972 | Robinson | 128/1 R |
| 3,704,704 | 12/1972 | Gonzales | 128/1 R |
| 3,707,957 | 1/1973 | Bucalo | 128/1 R |

*Primary Examiner*—Dalton L. Truluck
*Attorney, Agent, or Firm*—Steinberg & Blake

[57] ABSTRACT

A valve adapted to be inserted into an interior passage of a living creature, such as a vas valve. The valve has inner and outer components with said outer component carrying at an exterior surface thereof a structure for promoting ingrowth of tissue into tight engagement with the exterior surface of the outer component. This structure for promoting the ingrowth of tissue may take the form of a fine gold wire which is wound around and carried by the exterior valve component or it may take the form of a body carried by the exterior surface of the outer component and having pores which are sufficiently great for promoting the ingrowth of tissue.

5 Claims, 3 Drawing Figures

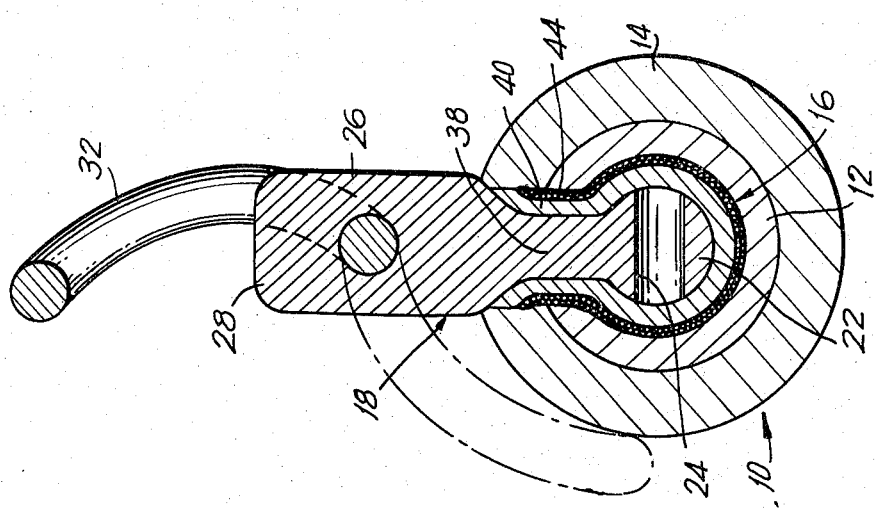
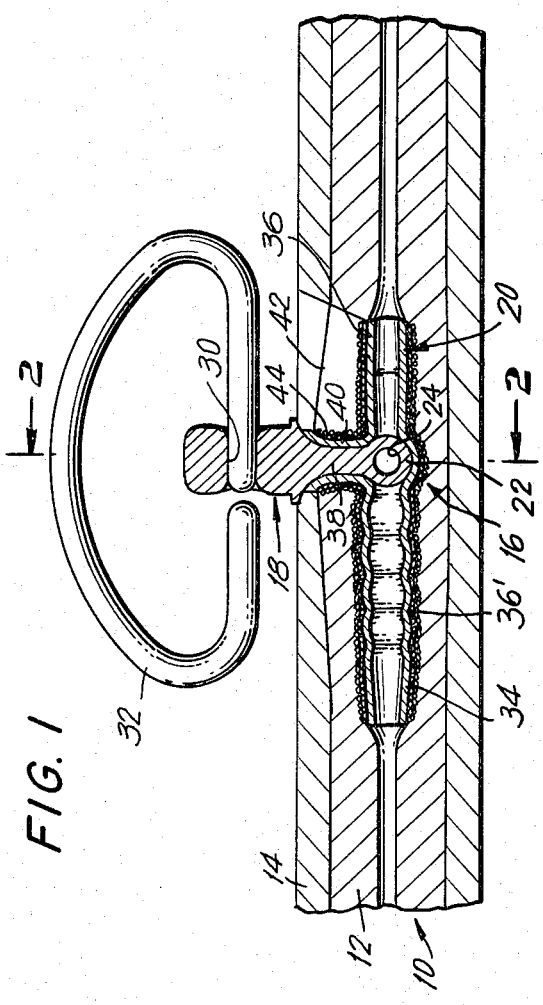

VALVE WITH MEANS FOR PROMOTING INGROWTH OF TISSUE

CROSS REFERENCE TO RELATED APPLICATION

The present application is a continuation-in-part of copending application Ser. No. 103,606, now U.S. Pat. No. 3,707,957, filed Jan. 4, 1971 and entitled Vas Valve.

BACKGROUND OF THE INVENTION

The present invention relates to structures for controlling the flow of fluid in the interior of passages of living creatures such as human beings.

Thus, the present invention relates to valves, such as vas valves, for example, adapted to be inserted into a tube in the body of a living creature for controlling the flow of fluid therethrough.

One of the problems encountered with structures of this type is that while the valve can be opened and closed to permit or prevent flow of fluid through the valve, it is essential to provide a fluid-tight union between the exterior surface of the valve and the tissue which forms the passage so as to assure secure mounting of the valve and so as to prevent flow of fluid along the exterior of the valve. It is clear that when a structure such as a valve is introduced into a passage in the interior of the body of a living creature in order to control the flow of fluid through the passage, the desired results will not be achieved if it is possible for the fluid to continue to flow through the passage along the exterior of the valve.

SUMMARY OF THE INVENTION

It is accordingly a primary object of the present invention to provide a structure which will avoid the above drawbacks.

In addition, it is an object of the present invention to provide a structure of this type which is simple and inexpensive while at the same time capable of effectively achieving the desired tightness in the mounting of a structure such as a valve so as to prevent in a fully reliable manner flow of fluid along the exterior of the valve.

In accordance with the invention a valve means is adapted to be inserted into an interior passage of the body of a living creature to control the flow of fluid therethrough, and this valve means carries at its exterior a matrix means for promoting the ingrowth of tissue so as to achieve between the valve means and the tissue of the living creature a tight union which will reliably prevent flow of fluid along the exterior of the valve means while at the same time securely mounting the latter in the interior of the passage.

BRIEF DESCRIPTION OF DRAWINGS

The invention is illustrated by way of example in the accompanying drawings which form part of this application and in which:

FIG. 1 is a longitudinal sectional elevation of one possible embodiment of the present invention according to which a vas valve is illustrated in the interior of a human vas;

FIG. 2 is a transverse section of the structure of FIG. 1 taken along line 2—2 of FIG. 1 in the direction of the arrows and showing the structure on an enlarged scale as compared to FIG. 1, with the handle of FIG. 1 being shown in solid lines in one position and in dot-dash lines in a second position; and FIG. 3 is a longitudinal sectional elevation of another embodiment of a valve according to the invention.

DESCRIPTION OF PREFERRED EMBODIMENTS

Referring now to FIG. 1, there is schematically represented therein a vas 10 which includes the vas proper 12 surrounded by tissue 14. Situated within the vas 10 is the structure of the present invention which includes the valve 16. This valve 16 includes an inner component 18 and an outer component 20. In the illustrated example the inner component 18 has at one end a valve body 22 which is of a spherical configuration and which is formed with a bore 24 passing therethrough. As is particularly apparent from FIG. 2, the bore 24 extends perpendicularly across the axis of an elongated stem 26 of the inner component 18. The stem 26 and the valve body 22 are integral, and the entire inner component 18 can rotate about the axis of the stem 26. This stem 26 terminates distant from the valve body 22 in an outer operating end portion 28 situated beyond the vas 10 and formed with a bore 30 passing therethrough.

This bore 30 receives part of a wire handle 32, which may be made of any suitable material compatible with the human body such as tantalum, for example. Thus, the handle 32 is accessible for manual turning of the inner component 18 between the illustrated closed position and an open position angularly displaced about the axis of the stem 26 through 90° with respect to the closed position. In the open position of the valve the axis of bore 24 coincides with the axis of the hollow tubular interior of the vas 10 while in the closed position of the valve the axis of the bore 24 extends perpendicularly across the hollow interior of the vas. The handle 32 is curved laterally in the manner shown in FIG. 2 so it can be swung in a counterclockwise direction, as viewed in FIG. 2, from the position shown in FIG. 2 into an inoperative rest position where it will be situated directly alongside of the vas 10.

The outer component 16 of the valve consists of a material which is compatible with the human vas, and the inner component 18 is also made of the same material. For example, these components may be made of gold, although other material such as platinum or rhodium may be used.

In the position of the parts shown in FIG. 1, the tubular extension 34 which is longer than the extension 33 forms the upstream extension of the outer component 16. The extension 34 is formed with a series of annular constrictions 36 distributed along the extension 34 in order to enhance the mounting of the valve in the vas.

The part 38 of the valve stem 26, which is directly adjacent the valve body 22, is of a lesser diameter than the outer operating end portion 28 of the stem 26, and this part 38 is surrounded by a tubular portion 40 of the outer component 16. These components as well as the valve body 22 and the inner surface of outer component 16 engaged thereby have a fluid-tight engagement with each other.

The valve is inserted into the vas after a relatively short longitudinal slit 42 is formed in the vas. This slit is schematically represented in FIG. 1. After the slit 42 is formed, the surgeon can readily introduce the extension 34 into the interior of the vas into the position shown in FIG. 1 and then the rest of the valve can be introduced into the vas until it assumes the position shown in FIG. 1. The wall of the vas will of course heal at the slit 42 so as to close the latter.

In order to form an intimate union with the vas wall, a matrix means of the invention surrounds the outer component 16 at the exterior surface thereof. In the example shown in FIGS. 1 and 2, this matrix means takes the form of a fine gold wire which is wound directly around the component 16 along the extensions and tubular portion 40 thereof so as to provide at the exterior surface of the outer component 16 of the valve means a filamentary tissue-ingrowth means having an irregular exterior surface structure and many interstices into which the tissue can grow for the purpose of achieving the desired intimate bond or union with the valve. Considering extensions 34 or tubular portion 40, it will be seen that each of these parts of the valve forms a tubular portion surrounding a given axis, and it will be noted that the filamentary means at the exterior surface of each of these tubular portions engages the exterior surface without interruption circumferentially around this axis. Thus, the matrix means will promote the ingrowth of tissue in such a way that the valve will be securely mounted with complete fluid-tightness preventing any flow of fluid along the exterior of the valve.

According to the embodiment of the invention which is illustrated in FIG. 3, the valve structure is identical with that described above and is designated by the same reference characters. However, in this case the matrix means 50 takes the form of a body which surrounds and is carried by the exterior surface of the outer component 16, this body 50 being formed with pores which are large enough to permit the ingrowth of tissue directly into the pores of the body or matrix means 50 so as to achieve the desired intimate union or bond with the tissue of the living creature. This matrix means 50 may also be made of gold or any other material compatible with the human body. The matrix means 50 may be achieved by spraying gold onto the exterior surface of the component 16 in a suitable evacuated atmosphere, for example. Also it is possible to form the body 50 from particles of gold which are applied with even pressure against the exterior surface of the component 16 to achieve a sintered body which will have the required porosity.

Thus, either with the matrix means in the form of a fine gold wire wound around the exterior surface of the outer component of the valve means or by way of the porous matrix means 50 covering the exterior surface of the outer component of the valve means it is possible to promote the ingrowth of tissue in such a way that the desired results are achieved.

What is claimed is:

1. For use in the body of a living creature, valve means adapted to be inserted into an interior passage of the body for controlling the flow of fluid therethrough, and filamentary means extending around and carried by an exterior surface of said valve means for promoting ingrowth of tissue into tight engagement with said exterior surface, said exterior surface surrounding a given axis and said filamentary means being wound continuously around and engaging said exterior surface without interruption circumferentially around said axis, said living creature being a human being and said valve means being small enough to be inserted into a human vas and being made of a material compatible with the interior of the body, said valve means having outer and inner components and said filamentary means being carried by said outer component of said valve means.

2. The combination of claim 1 and wherein said filamentary means is in the form of a filament extending around and surrounding said outer component at least at a part thereof.

3. The combination of claim 2 and wherein said filament is in the form of a fine wire.

4. The combination of claim 3 and wherein said wire is a fine gold wire.

5. The combination of claim 3 and wherein said inner component of said valve means includes a valve member and stem extending therefrom and said outer component of said valve means includes a tubular housing fluid-tightly surrounding said valve member and stem and having tubular extensions respectively forming a valve inlet and a valve outlet, and said wire surrounding said outer component substantially along the entire exterior surface thereof.

* * * * *